(12) United States Patent
Byberg et al.

(10) Patent No.: US 8,783,649 B2
(45) Date of Patent: Jul. 22, 2014

(54) SLEEVE VALVE WITH PERMANENT END POSITION

(75) Inventors: Arve Byberg, Klepp Stasjon (NO); Ketil Ronning, Stavanger (NO)

(73) Assignee: Seawell Oil Tools AS, Stavanger (NO)

( * ) Notice: Subject to any disclaimer, the term of this patent is extended or adjusted under 35 U.S.C. 154(b) by 76 days.

(21) Appl. No.: 13/159,606

(22) Filed: Jun. 14, 2011

(65) Prior Publication Data
US 2011/0308622 A1 Dec. 22, 2011

(51) Int. Cl.
*F16K 35/00* (2006.01)

(52) U.S. Cl.
USPC ............................ 251/89; 251/344; 251/345

(58) Field of Classification Search
USPC ............ 251/89, 94, 343, 344, 89.5, 345, 347;
166/316, 318, 332.1, 323, 330, 386
See application file for complete search history.

(56) References Cited

U.S. PATENT DOCUMENTS

| 2,603,163 | A | * | 7/1952 | Nixon | 166/212 |
| 3,051,246 | A | * | 8/1962 | Clark, Jr. et al. | 166/325 |
| 3,071,193 | A | * | 1/1963 | Raulins | 166/332.4 |
| 3,749,119 | A | * | 7/1973 | Tausch et al. | 137/461 |
| 6,386,289 | B1 | * | 5/2002 | Patel | 166/325 |
| 6,684,958 | B2 | * | 2/2004 | Williams et al. | 166/386 |
| 2003/0192703 | A1 | | 10/2003 | Williams et al. | |
| 2011/0030975 | A1 | | 2/2011 | Duphorne | |

FOREIGN PATENT DOCUMENTS

| WO | 2007084006 A1 | 7/2007 |
| WO | 2008112333 A1 | 9/2008 |

OTHER PUBLICATIONS

Combined Search and Examination Report for British Application No. 1110145.8, Aug. 10, 2011 (6 p.).
Search Report for Norwegian Application No. 20100900, Jan. 7, 2011 (2 p.).

* cited by examiner

*Primary Examiner* — John K Fristoe, Jr.
*Assistant Examiner* — Jonathan Waddy
(74) *Attorney, Agent, or Firm* — Conley Rose, P.C.

(57) ABSTRACT

A sleeve valve including a permanent end position and comprising an inner sleeve concentrically disposed within an outer sleeve comprising at least one radially facing outer opening and an operating range defined by an open position in which the inner sleeve does not block the outer opening, and a closed position in which the inner sleeve blocks the outer opening. The inner sleeve is axially displaceable or rotatable within the outer sleeve to provide an operating range in the longitudinal direction or an operating range in the form of an angle. At least one plastically deformable locking area of one the inner or outer sleeve is adapted for being radially deformed into a locking groove of the other sleeve when the inner sleeve is moved outside of the operating range.

9 Claims, 2 Drawing Sheets

SLEEVE VALVE WITH PERMANENT END POSITION

CROSS-REFERENCE TO RELATED APPLICATIONS

This application claims the benefit under 35 U.S.C. §119 (a) of Norwegian Patent Application 20100900 filed Jun. 22, 2010 and entitled "Sleeve Valve with Permanent End Position," hereby incorporated herein by reference for all purposes.

STATEMENT REGARDING FEDERALLY-SPONSORED RESEARCH OR DEVELOPMENT

Not applicable.

FIELD OF THE INVENTION

The present invention relates to a sleeve valve having a permanent end position, for use particularly in hydrocarbon exploration and production. Further, the invention relates to a method for using a sleeve valve.

BACKGROUND

For the exploration and production of oil, gas, and other hydrocarbons, a first step is to drill a relatively large diameter borehole. The drill string is then pulled out, and a steel pipe or casing is run into the wellbore. Typically, the casing is cemented in place in the surrounding formation. When the cement is sufficiently hardened, a new section is drilled, the drill string is tripped out, and a liner is hung off in the existing casing. Then the liner is cemented in place in the formation, and the process is repeated until the wellbore has reached the desired depth. It is also common to drill horizontal branches into geological layers containing hydrocarbons. A cased wellbore, therefore, is comprised of a series of pipe sections, the diameters of which decrease successively with the distance from the surface.

Cementing is usually accomplished by pumping cement slurry down the casing and out through a valve at the wellbore bottom so that it is discharged into the annulus between the formation and casing and flows back in an uphole direction. Once the annulus has been filled with fluid cement the cementing valve must be closed permanently before any excess cement is removed from the interior of the wellbore. In order to avoid that a lengthy pipe is filled with excess cement, it is common to insert separating plugs in front of and behind the cement flow. These separating plugs separate between a volume of cementing slurry and a circulation liquid (mud) in front of and behind the cement in the fluid flow. Therefore, a need exists for a valve that is able to be opened and closed several times in order to direct the various fluid flows to different locations before the valve is permanently closed.

Typically, a cemented section is perforated using a shaped explosive charge which pierces the casing and creates fractures in the surrounding formation so that hydrocarbons are able to flow into the well. Such explosive charges may potentially damage or destroy porous formations. Therefore, instead of using the above method involving cementing and explosive penetration, it may be desirable to provide a section with one or more valves and/or sand screens which can be opened when the well is put into production. It may also be desirable to be able to open and close such valves several times before they are opened or closed permanently.

At larger oil and gas fields it is common to drill injection wells at a distance from the production well(s). These are used for injecting fluids in order to increase the reservoir pressure and/or injecting chemicals in order to increase the production from the field. Also with injection wells there is a need for valves that can be opened and closed multiple times before they are permanently closed.

A sleeve valve is a type of valve commonly used in the above applications. The present invention is based on the same principle as other sleeve valves, in which an inner hollow shaft or sleeve is moved axially or rotated within an outer valve housing. When openings in the inner sleeve are aligned with openings in the outer housing the valve is open, and when the openings are not aligned, the valve is closed.

Numerous techniques are known for moving the inner sleeve relative to the outer valve housing, by way of a pipe string, a coiled tubing, or a well tractor, for example. In some applications, an actuation tool suspended from a cable (a "wireline", or, if the cable carries power, "e-line") may be used. As a last alternative is mentioned actuation through the use of a drop ball which is pumped or dropped down a pipe until it engages a seat of the tool to be actuated and blocks for further flow therethrough. Then, hydraulic pressure of the liquid column above the tool is used for activating or deactivating the valve. Any of these techniques or any other prior art method for opening or closing a sleeve valve in a wellbore may be used with the present invention.

In conventional technology, radially biased locking lugs are used for locking together an inner sleeve and an outer housing more or less permanently. A disadvantage of such locking lugs, in some applications, is that the spring providing the radial biasing force, whether it is a leaf spring, coil spring, or some other means, like the rest of the mechanism, must be made of a relatively expensive high quality steel material in order to avoid corrosion and wear. In other applications, it is important that the locking mechanism is shielded so that cement, drill cuttings, formation sand, etc, for example, are not able to get into the mechanism and prevent it from working properly. In other words, a need exists for a valve that can be closed permanently without the use of expensive steel qualities and/or sealing means.

The United States Patent Application US 2003/0192703 A1 describes various techniques for maintaining a valve flapper in an open position. Variants in which a collar run in on a tool and radially plastically deformed to lockingly engage an inner wall of the valve housing and thereby block for a flow pipe which, in turn, keeps the valve flapper in an open position, are described. A disadvantage of this method is that additional parts must be run down from the surface to retain the flapper in an open position.

Hence, a need exists for valves which can be opened and closed using conventional means, and which can be permanently kept in an open or closed end position.

Thus, the present invention provides a valve which is more robust, reliable, and inexpensive to fabricate than prior art valves for similar purposes, and which, moreover, is not encumbered with the above disadvantages.

SUMMARY OF THE INVENTION

This is achieved according to the present invention by providing a permanent end position sleeve valve comprising an inner sleeve disposed within an outer sleeve having at least one radially facing outer opening and an operating range defined by an open position in which the inner sleeve does not block the outer opening, and a closed position in which the inner sleeve blocks the outer opening, where at least one plastically deformable locking area of the one sleeve is adapted for being deformed radially into a locking groove of the other sleeve when the inner sleeve is moved outside of the operating range.

A method for using sleeve valve comprises: opening and/or closing the valve at least once through the relative movement of an inner sleeve within an operating range on an outer sleeve, further characterized by shifting the inner sleeve beyond the operating range until a plastic deformation zone of one of said sleeves is deformed plastically into a locking groove of the other of said sleeves, whereby said sleeves are permanently locked to each other.

When the inner sleeve is inside the operating range, the plastically deformable region rests against a sleeve wall and therefore is not deformed. In this manner, the valve may be opened and closed repeatedly until the inner sleeve is moved outside of the operating range until the deformable region is aligned with a locking groove. If a sufficiently high pressure is applied against a working surface in the deformation zone, the plastically deformable region will enter into the locking groove to permanently lock the valve. In this manner, relatively expensive and corrosion resistant metal elements can be replaced with a simple tubular element or piece fixedly mounted in one of the sleeves.

BRIEF DESCRIPTION OF DRAWINGS

A preferred embodiment of the invention will now be described in more detail with reference to the accompanying drawings, in which.

DETAILED DESCRIPTION

For practical reasons, an inner sleeve which is moved relative to a fixed outer sleeve is described herein. It is noted that relative movement between the outer and inner sleeves may be described in this manner with no loss of generality. It must also be understood that the sleeves may be of any shape that allows for relative axial movement or rotation of the sleeves. Thus, the outer sleeve may have an arbitrary external shape and a rotationally symmetric, e.g. cylindrical or conical, inner surface if the sleeves are to be rotated relative to each other. The inner surface may be provided with elevations in the direction of rotation if axial movement between the sleeves is to be prevented, or with elevations in the longitudinal direction if the inner sleeve is to be axially movable and rotationally locked within the outer sleeve. For practical reasons both sleeves are illustrated as being cylindrical in the figures. It must also be understood that, in the interest of clarity, the necessary packers and other elements that are not directly pertinent to the present invention are not shown in the figures.

FIGS. 1a-1d schematically show a part of a sleeve valve comprising a hollow inner sleeve 2 axially slidably disposed within an outer sleeve 1. A second embodiment wherein the inner sleeve 2 is rotatably disposed within the outer sleeve is shown in FIG. 2 and described in more detail below.

Figure 1A:
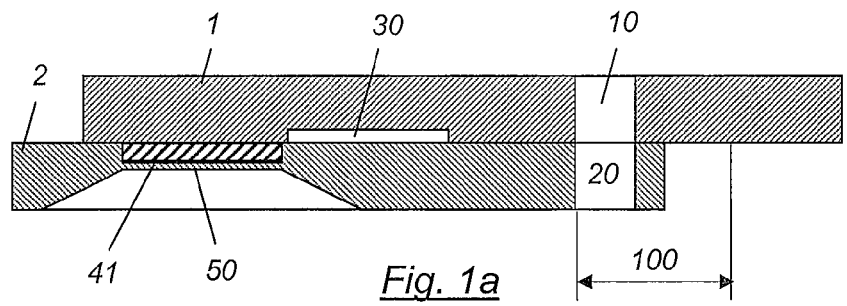
FIG. 1a is a schematic section through a part of a valve wherein an inner sleeve is axially displaceably arranged within an outer sleeve.

FIG. 1a shows a section through a part of an outer sleeve wall 1 having a radially facing outer opening 10 and through a part of an inner sleeve wall 2 having a radially facing inner opening 20. In FIG. 1a, the sleeve valve is shown in an open position in which the inner openings 20 are aligned with the outer openings 10. Sleeve 2 further exhibits a plastically deformable region 50, which in FIGS. 1a through 1d is fitted with a locking piece 41. Locking area 50 may be, for example, a thin integrated part of the wall of the inner sleeve 2 which pushes one or more locking pieces 41 radially outwards into corresponding locking grooves. It must also be understood that, in some embodiments, the plastically deformable region or locking area 50 may be pushed outwards into locking groove 30 with no locking piece 41, but that the combination shown of a soft deformable element and a harder locking piece 41 in the plastically deformable locking area 50 may be advantageous.

Figure 1B:
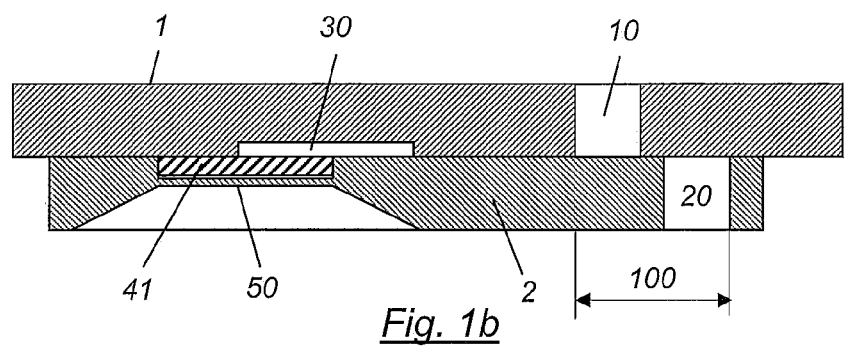
FIG. 1b shows the part of FIG. 1a in a closed position.
Figure 2:
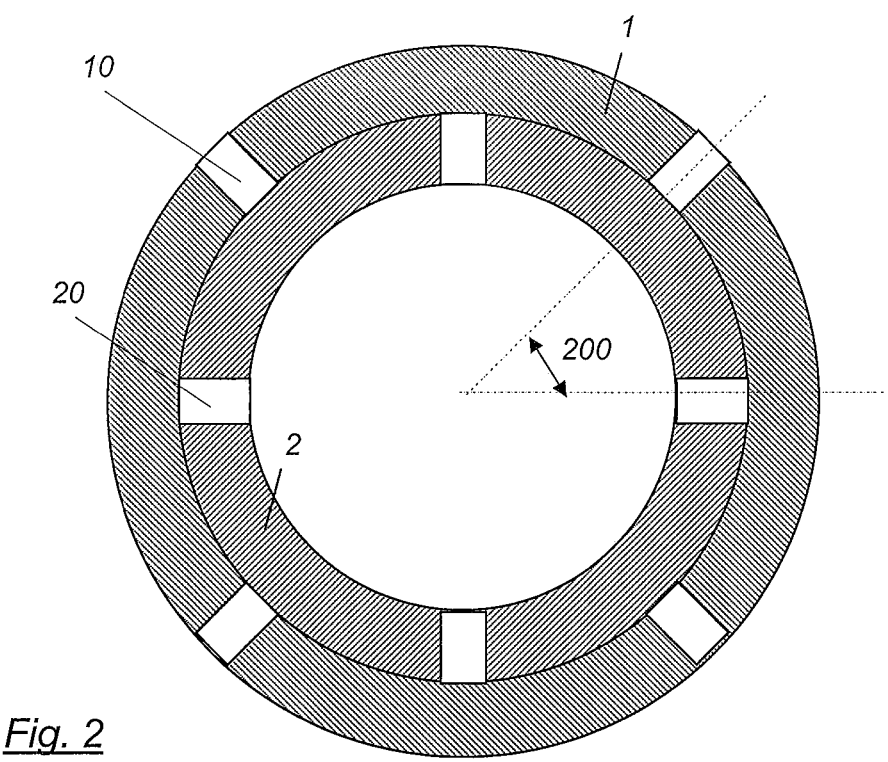
FIG. 2 is a schematic section through a valve wherein an inner sleeve is rotatably arranged within an outer sleeve.

FIG. 1b shows the same parts as FIG. 1a, but in FIG. 1b the inner sleeve 2 has been shifted to a closed position within an operating range 100.

The inner openings 20 are not absolutely necessary in an axially displaceable inner sleeve 2. In an alternative embodiment (not shown), the open position may be defined in that the one end of the inner sleeve is pulled back (to the left in FIG. 1) so that the inner sleeve will not block the radially facing outer openings 10. The closed position may be similarly defined in that the one end of the inner sleeve is pushed forward (to the right in FIG. 1) so that the inner sleeve blocks the radially facing outer openings 10.

The inner sleeve 2 blocks the radially facing outer openings 10 both in the variant including radially facing inner openings 20 and in the variant (not shown) having no radially facing inner openings.

When the inner sleeve 2 in FIG. 1 is located within the operating range 100, a support for a plastically deformable locking area 50 is provided on one of the sleeves. As can be seen in FIGS. 1a-1d, the plastically deformable region 50 is provided on the inner sleeve, and an inner wall of the outer sleeve 1 provides the support preventing region 50 from deforming and getting permanently locked into locking gate 30 when the inner sleeve 2 is moved between the open and closed positions within the operating range 100. A person with skills in the art will understand that, in other applications, it will be useful to provide the outer wall with a deformation zone, so that an outer surface of the inner sleeve 2 constitutes the support that prevents deformation.

Figure 1C:
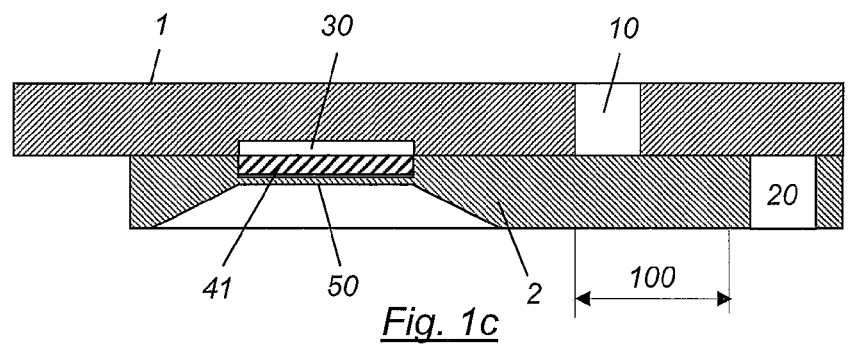
FIG. 1c shows the part of FIG. 1a as shifted to a permanently closed position.
Figure 1D:
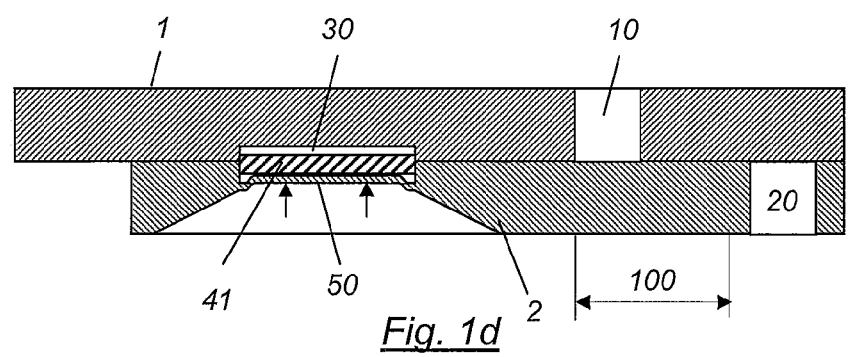
FIG. 1d shows the part of FIG. 1a with hydraulic pressure causing plastic deformation.

FIG. 1c shows a possible scenario in which the inner sleeve 2 is shifted within the outer sleeve 1 until the deformable region 50 with locking piece 41 is aligned with locking groove 30. This position is described as being "outside of the operating range". In FIG. 1c, the plastically deformable region 50 is not deformed, and locking piece 41 has not been pushed outwardly into locking groove 30. FIG. 1c could illustrate an instant scenario in an application in which the deformation of region 50 starts once locking piece 41 is aligned with locking groove 30. Alternatively, FIG. 1c could illustrate an intermediate condition in which no deformation occurs until a sufficiently high hydraulic pressure is applied in a central bore of the inner sleeve 2. Such a hydraulic pressure acting on an inner working surface of the inner sleeve 2, hence applying a radially directed force, is illustrated by short arrows in FIG. 1d.

Thus, when a plastically deformable region 50, which may or may not include a locking piece 41, is provided on a first sleeve, a locking groove is provided on the second sleeve. The purpose of locking groove 30 is to remove the support which prevents deformation, so that the deformable region 50, optionally including a locking piece 41 as illustrated, may be deformed into the locking groove to permanently lock the valve.

It must be understood that the valve may be locked permanently open or locked permanently closed depending on its location of use and intended function.

FIG. 2 shows an embodiment of a sleeve valve in which an inner sleeve 2 is rotatable within an outer sleeve 1 between the closed position shown in FIG. 2 and an open position in which the inner sleeve 2 does not block the radially facing outer openings 10. In the embodiment shown in FIG. 2, the inner sleeve 2 is provided with radially facing inner openings 20, which, in the open position, are aligned with the outer openings 10. An operating range 200 is illustrated as an angle between the open and closed positions. Although not shown in FIG. 2, it must be understood that a plastically deformable region 50, including a locking piece 41 or not, and a locking groove 30 are also provided in this embodiment. The working principle of the plastically deformable region 50 and locking groove 30 is similar to the working principle of the corresponding elements described in connection with FIGS. 1*a*-1*d*.

Figure 3:
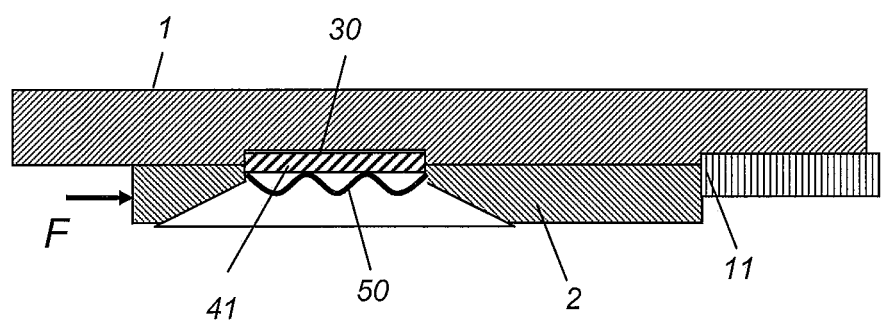
FIG. 3 shows the part of FIG. 1a with an axially directed force causing plastic deformation.

FIG. 3 shows an alternative embodiment of a feature of the same valve as the one shown in FIGS. 1*a* through 1*d*. In FIG. 3, the plastically deformable region 50 is deformed through the application of an axial force F. A shoulder 11 on the inner surface of the outer sleeve 1 prevents the inner sleeve 2 from being pushed further axially along the outer sleeve 1 when the force F is applied. When region 50 is deformed, a locking piece 41 is pushed outwards into locking groove 30. For example, the axial force F may be applied by way of a pipe string or using a running tool. Hence, in this embodiment, it is not necessary to apply a hydraulic pressure in the central bore which is sufficiently high to cause the plastically deformable region 50 to deform.

What is claimed is:

1. A permanent end position sleeve valve having a central axis, the sleeve valve comprising:

an inner sleeve concentrically disposed within an outer sleeve, wherein the outer sleeve comprising at least one opening extending radially therethrough;

wherein the inner sleeve is configured to move relative to the outer sleeve between an open position in which the inner sleeve does not block the at least one opening in the outer sleeve, a closed position in which the inner sleeve blocks the at least one opening in the outer sleeve, and a locking position in which the inner sleeve blocks the at least one opening in the outer sleeve;

wherein the closed position is between the open position and the locking position;

wherein the inner sleeve or the outer sleeve comprises at least one plastically deformable locking area configured to plastically and permanently deform radially into a locking groove of the other of the inner sleeve or the outer sleeve when the inner sleeve is moved to the locking position.

2. The sleeve valve of claim 1, where the inner sleeve is axially slidably arranged within the outer sleeve; wherein the inner sleeve is configured to move axially relative to the outer sleeve between the open position, the closed position, and the locking position; and wherein the closed position is axially disposed between the open position and the locking position.

3. The sleeve valve of claim 2, wherein the locking groove is annular and extends around the entire circumference of the inner or outer sleeve.

4. The sleeve valve of claim 1, wherein the inner sleeve is rotatably arranged within the outer sleeve wherein the inner sleeve is configured to rotate relative to the outer sleeve between the open position, the closed position, and the locking position, and wherein the closed position is rotationally disposed between the open position and the locking position.

5. The sleeve valve of claim 2, wherein the locking groove extends axially along the inner sleeve or the outer sleeve.

6. The sleeve valve of claim 4, wherein the locking groove extends axially along the inner sleeve or the outer sleeve.

7. The sleeve valve of claim 1, where the locking area comprises at least one locking piece.

8. The sleeve valve of claim 1, wherein the locking area comprises an integrated part of the inner sleeve.

9. The sleeve valve of claim 1, wherein the locking area is a deformable element fixedly connected to the inner sleeve.

* * * * *